(12) United States Patent
Ziech

(10) Patent No.: US 8,795,125 B2
(45) Date of Patent: Aug. 5, 2014

(54) TANDEM AXLE WITH OPTIMIZED INTER-AXLE DRIVE

(71) Applicant: Dana Heavy Vehicle Systems Group, LLC, Maumee, OH (US)

(72) Inventor: James F. Ziech, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 13/795,284

(22) Filed: Mar. 12, 2013

(65) Prior Publication Data

US 2013/0244825 A1 Sep. 19, 2013

Related U.S. Application Data

(60) Provisional application No. 61/612,366, filed on Mar. 18, 2012.

(51) Int. Cl.
*F16H 48/06* (2006.01)

(52) U.S. Cl.
USPC .......................... 475/221; 475/230; 180/248

(58) Field of Classification Search
USPC ......... 475/198, 200, 202, 220–222, 230, 302, 475/332, 336, 343; 180/233, 248, 249
See application file for complete search history.

(56) References Cited

U.S. PATENT DOCUMENTS

| | | |
|---|---|---|
| 967,728 A | 8/1910 | Charley |
| 1,203,662 A | 11/1916 | Thomas |
| 1,492,380 A | 4/1924 | Leipert |
| 1,704,301 A | 3/1929 | Moreland |
| 1,711,128 A | 4/1929 | Robbins |
| 1,733,688 A | 10/1929 | Ledwinka |
| 1,780,599 A | 11/1930 | Parker |
| 1,791,138 A | 2/1931 | Masury |
| 1,794,099 A | 2/1931 | Alden |
| 1,856,748 A | 3/1932 | Davis |
| 1,906,613 A | 5/1933 | Keese |
| 1,913,799 A | 6/1933 | Fageol |
| 1,933,667 A | 11/1933 | Fageol |
| 1,956,583 A | 5/1934 | Morgan |
| 1,992,365 A | 2/1935 | Fageol |
| 2,116,484 A | 5/1938 | Baker |
| 2,200,658 A | 5/1940 | Singleton |
| 2,477,925 A | 8/1949 | Gentry |
| 2,870,853 A | 1/1959 | Keese |
| 2,870,854 A | 1/1959 | Keese |
| 2,914,128 A | 11/1959 | Christie |
| 3,029,888 A | 4/1962 | Tapp |
| 3,146,842 A | 9/1964 | Nelson |
| 3,324,965 A | 6/1967 | Koch |
| 3,706,350 A | 12/1972 | Bokovoy |
| 3,976,154 A * | 8/1976 | Clark et al. ................ 180/24.05 |
| 4,050,534 A | 9/1977 | Nelson |
| 4,733,578 A | 3/1988 | Glaze |
| 4,754,847 A | 7/1988 | Glaze |
| 4,887,487 A | 12/1989 | Mayfield |
| 5,226,860 A * | 7/1993 | Baxter et al. .................. 475/206 |
| 5,370,018 A | 12/1994 | Kwasniewski |
| 5,465,820 A * | 11/1995 | Dick .............................. 192/35 |

(Continued)

*Primary Examiner* — Justin Holmes
(74) *Attorney, Agent, or Firm* — Marshall & Melhorn, LLC

(57) ABSTRACT

Various drive axle systems are described each having a bevel gear system associated with the front axle system that is designed to minimize the angle of the inter-axle driveline with respect to the rear axle pinion gear.

13 Claims, 3 Drawing Sheets

(56) References Cited

U.S. PATENT DOCUMENTS

| | | | |
|---|---|---|---|
| 6,830,122 B2* | 12/2004 | Kroppe | 180/197 |
| 8,387,741 B2* | 3/2013 | Mair et al. | 180/378 |
| 2002/0177501 A1 | 11/2002 | Turner | |
| 2003/0130047 A1 | 7/2003 | Brissette | |
| 2003/0183439 A1 | 10/2003 | Penzotti | |
| 2003/0190992 A1 | 10/2003 | Holman | |
| 2004/0089484 A1 | 5/2004 | Oates | |
| 2004/0176206 A1 | 9/2004 | Oates | |
| 2004/0266579 A1 | 12/2004 | Ziech | |
| 2005/0247148 A1* | 11/2005 | Slesinski et al. | 74/424 |
| 2006/0089226 A1 | 4/2006 | Garcia | |
| 2006/0276297 A1* | 12/2006 | Ziech | 475/221 |
| 2007/0117672 A1 | 5/2007 | Elvins | |
| 2013/0017927 A1* | 1/2013 | Morscheck et al. | 477/35 |

* cited by examiner

TANDEM AXLE WITH OPTIMIZED INTER-AXLE DRIVE

RELATED APPLICATIONS

This application claims priority to and the benefit from U.S. Provisional Patent Application Ser. No. 61/612,366 filed on Mar. 18, 2012, which is fully incorporated by reference herein.

FIELD OF THE INVENTION

The present invention relates to a vehicle drivetrain and a drive axle system for the vehicle drivetrain capable of driving two axles.

BACKGROUND OF THE INVENTION

Trucks may utilize tandem axles where the axles are connected together by an inter-axle drive shaft. The forward tandem axle has parallel axis input and output shafts with the input on the upper shaft centerline, a helical gear drop to the forward axle pinion and a parallel output on the upper centerline to the rear axle. The forward tandem axle chassis mounting must optimize the transmission to forward tandem axle drive shaft universal joint angles. The inter-axle drive shaft is then a compromise for the universal joint operating angles resultant from the front/rear axle side view installation angles. The typical tandem hypoid rear axle gear set has lower efficiency as compared to a spiral bevel gear set. The tandem rear axle can utilize spiral bevel gears to improve the inter-axle drive shaft joint angles and efficiency but the joint angles cannot be completely optimized. Alternatively, the tandem rear axle can be a negative offset hypoid to achieve the best inter-axle shaft joint angles but this arrangement necessitates several rear axle negative hypoid primary gear set performance deficiencies. The above summarized compromises associated with tandem axles typically results in poor noise, harshness and vibration in the driveline as well as decreased durability.

SUMMARY OF THE INVENTION

A drive axle system for a vehicle comprises a first axle assembly and a second axle assembly. The first axle assembly comprises an input shaft, a transfer shaft concentric with the input shaft, a drive gear and a pinion gear and a ring gear. A clutch selectively connects the input shaft with the drive gear. The drive gear is connected to a driven gear. One or both of the gears maybe a bevel-type gear so that the driven gear locates an inter-axle assembly at an angle. The inter-axle assembly is connected to a second axle assembly, comprised of a ring and pinion gear. The pinion gear is substantially collinear with the inter-axle assembly.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
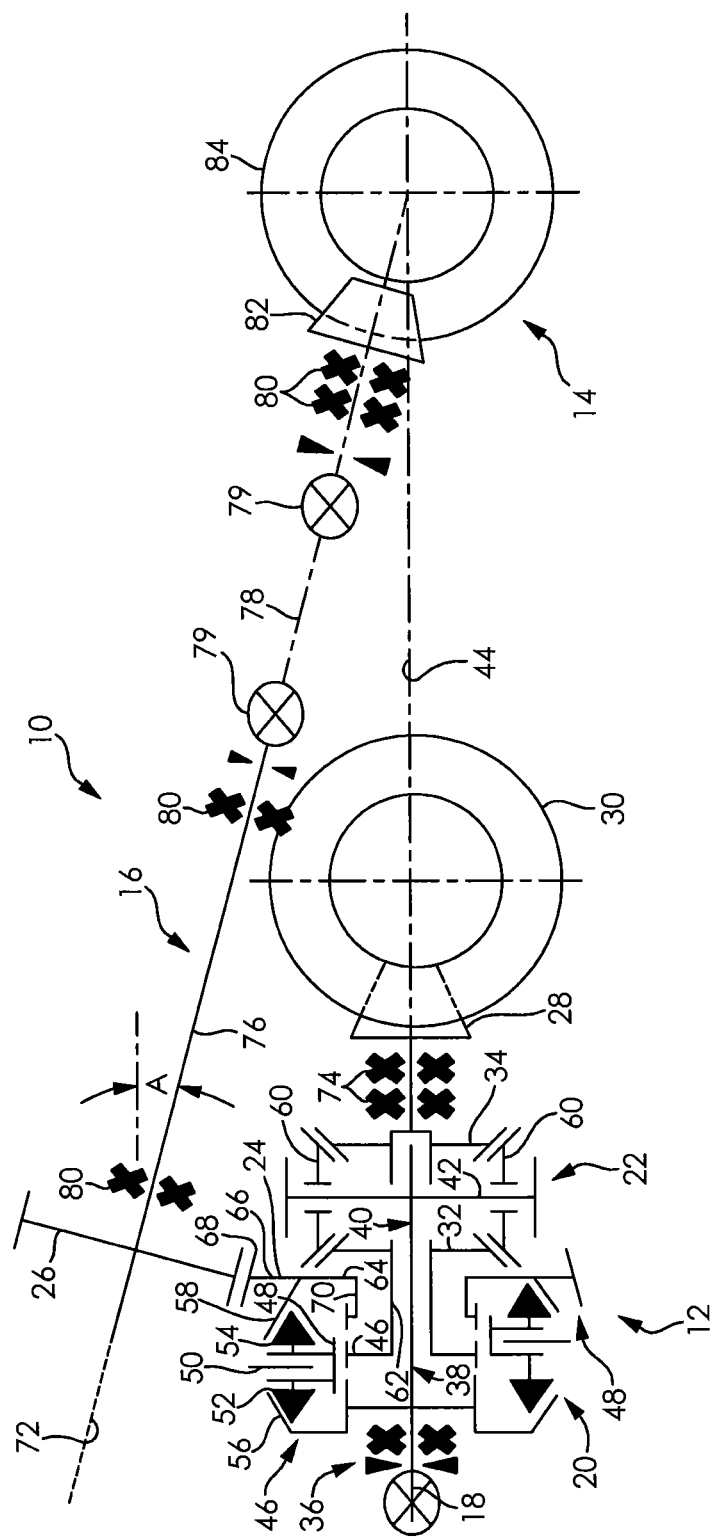
FIG. 1 depicts a schematic side view of one embodiment of a tandem axle system.

FIG. 1 illustrates a schematic side view of a drive axle system 10 for a vehicle according to a first embodiment. The drive axle system 10 includes a first axle assembly 12, a second axle assembly 14, and an inter-axle shaft assembly 16. The first axle assembly 12 and second axle assembly 14 may be part of a tandem axle system. The drive axle system 10 forms a portion of a vehicle drivetrain. As a non-limiting example, the drive axle system 10 may form a portion of the vehicle drivetrain of a semi-tractor; however it is understood the drive axle system 10 may be used in other applications.

The first axle assembly 12 includes an input shaft 18, an inter-axle clutch 20, an inter-axle differential 22, a second axle drive gear 24, a second axle driven gear 26, a first axle bevel pinion 28, and a first axle bevel gear 30. The inter-axle differential 22 includes a first inter-axle differential output gear 32 and a second inter-axle differential output gear 34. The first axle assembly 12 is disposed in a first housing (not shown) and is drivingly engaged with a transmission (not shown) of the vehicle, a first differential and axle (both not shown), and the inter-axle assembly 16.

The input shaft 18 has a first end 36 drivingly engaged with the transmission, a middle portion 38 that may be drivingly engaged with the inter-axle clutch 20, and a second end 40 drivingly engaged with a carrier 42 of the inter-axle differential 22. As shown in FIG. 1, the input shaft 18 is substantially parallel to a horizontal axis 44. Further, an axis of the input shaft is oriented so that it is substantially collinear with an axis of the first inter-axle differential output gear 32, the second inter-axle differential output gear 34, and an axis of the second axle drive gear 24.

The clutch 20 is selectively engagable with the input shaft 18, a transfer shaft gear 46 and the second axle drive gear 24. The inter-axle clutch 20 has a shift collar 48 driven by a shift fork 50 that moves the clutch 20 into selective engagement with the second axle drive gear 24 and the transfer shaft gear 46 or with the input shaft 18. Although a shift fork 50 is shown, it can be understood that the inter-axle clutch 20 may be any type of clutching device.

In the depicted embodiment, the clutch 20 is a cone type clutch. The clutch is comprised to a first cone-shaped ring 52 and a second cone-shaped ring 54. The first ring 52 is designed to selectively engage a complimentary shaped surface 56 mounted for rotation with the input shaft 18. The second ring 54 is designed to selectively engage a complimentary shaped surface 58 mounted for rotation on the second axle drive gear 24. The first and second rings are not engaged with their respective surfaces 56, 58, at the same time; when one is engaged, the other is disengaged.

The inter-axle differential 22 includes the spider 42, at least two driving pinions 60, the first inter-axle differential output gear 32, the second inter-axle differential output gear 34, and a transfer shaft 62. The first inter-axle differential output gear 32 and the second inter-axle differential output gear 34 disposed on the transfer shaft 64 form the side gears of the inter-axle differential 22. The inter-axle differential 22 is a bevel gear differential as known in the art, however, it may be any other type of differential. When a rotational force is applied to the spider 42, the driving pinions 60 apply the rotational force to the first inter-axle differential output gear 32 and the second inter-axle differential output gear 34, which rotates the transfer shaft 62.

The transfer shaft 62 is a hollow shaft rotatably disposed in the first housing and has an axis of rotation concentric with the axis of rotation of the input shaft 18. One end portion of the transfer shaft 62 has the side gears and the other end has the transfer shaft gear 46. The gear 46 may be replaced with splines.

The second axle drive gear 24 is a gear concentrically disposed on or about a portion of the transfer shaft 62. The second axle drive gear 24 may be disposed between the output gears 32, 34, and the transfer shaft gear 46. The second axle drive gear 24 is a substantially disc shaped body having an inner diameter portion 64, an outer diameter portion 66, and an engagement surface 68. The axis of the second axle drive gear 24 is concurrent with the axis of the input shaft 18. The inner diameter portion 64 may be selectively engaged with the inter-axle clutch 20. The engagement may be such as through a gear 70 or splines. A set of gear teeth are formed on the outer diameter portion 66. The outer diameter portion teeth form a bevel gear, and may be one of a modified helical gear, a spiral bevel gear, a beveloid gear, and a straight bevel gear. The second axle drive gear 24 is drivingly engaged with the second axle driven gear 26.

The second axle driven gear 26 is located on the outer diameter portion 66 of the second axle drive gear 24. More particularly, the second axle driven gear 26 is not concentric with the second axle drive gear 24 but instead it is in contact with a discrete location of the outer diameter portion 66 of the second axle drive gear 24. The second driven axle gear 26 is engaged with just the top of the second drive axle gear 24. This location elevates a rotational axis 72 of the second driven axle gear 26 above the second drive axle gear 24 and the other components of the first axle assembly 12. The driven gear 26 may be one of a modified helical gear, a spiral bevel gear, a beveloid gear and straight bevel gear.

The bevel of either, or both, of the second axle drive gear 24 and/or the second axle driven gear 26 results in the second axle driven gear axis 72 to be non-parallel to the axis of the input shaft 18, transfer shaft or the first axle bevel pinion 28, all of which are aligned with one another and the horizontal axis 44. More particularly, the second axle driven gear axis 72 is at an angle A that is 1 degree to 30 degrees below a horizontal axis.

The first axle bevel pinion 28 is drivingly coupled to the second output gear 34. The first axle bevel pinion 28 is rotationally supported on bearings 74. Alternately, the first axle bevel pinion 28 may be integrally formed with the second output gear 34. The first axle bevel pinion 28 may be one of a spiral bevel gear, a straight bevel gear, and a hypoid gear.

The first axle bevel gear 30 is drivingly engaged with the first axle bevel pinion 28. The rotation from the first axle bevel pinion 28 is imparted to the first axle bevel gear 30. The bevel gear 30 rotates the differential (not shown) which imparts rotation to the axle half shafts (not shown). The first axle bevel gear 30 may be one of a spiral bevel gear, a straight bevel gear, and a hypoid gear.

The second axle driven gear 26 is disposed on a driven shaft 76. The driven shaft 76 comprises a part of the inter-axle assembly 16. The assembly 16 also comprises an inter-axle shaft 78.

Bearings 80 disposed about the driven shaft 76 and the inter-axle shaft 78 support them for rotation. The driven shaft 76 is oriented substantially parallel and substantially co-axial with the axis 72 of the second axle driven gear 26. The driven shaft 76 is drivingly engaged with the inter-axle shaft 78, such as through a U-joint 79.

The inter-axle shaft 78 comprises at least one elongate cylindrical member drivingly engaged with the driven shaft 76 and a second axle bevel pinion 82. As illustrated, the inter-axle shaft 78 has U-joints 79 disposed on each end thereof. One joint 79 is connected to the driven shaft 76 and the other joint 79 is connected to a second axle bevel pinion 82. The inter-axle shaft 78 is oriented substantially parallel and substantially collinear to the driven shaft 76 and the second axle bevel pinion 82. Thus, the second axle bevel pinion 82 is angled with respect to the horizontal axis 44 and the input shaft 18.

Substantially collinear as used herein preferably means collinear or so that from one shaft to the next shaft not more than 6 degrees (plus or minus) of angle is provided. More preferably, substantially collinear as used herein means that there is not more than approximately 1 to 3 degrees (plus or minus) angle from one shaft to the next.

The second axle assembly 14 includes the second axle bevel pinion 82 and a second axle bevel gear 84. The second axle assembly 14 is disposed in a second housing (not shown) and is drivingly engaged with the inter-axle assembly 16 and a second differential and axle (both not shown).

The second axle bevel pinion 82 has gear teeth formed on an outer surface thereof. The second axle bevel pinion 82 may be one of a hypoid gear, a spiral bevel gear, a straight bevel gear, a positive offset hypoid gear, and a negative offset hypoid gear.

The second axle bevel gear 84 is coupled to a housing of the second differential by a plurality of fasteners or a weld and is rotatable about an axis thereof. Alternately, the second axle bevel gear 84 may be integrally formed with the second differential. As is known in the art, the second axle bevel gear 84 has gear teeth formed on an outer surface thereof. The second axle bevel gear 84 may be one of a spiral bevel gear or a straight bevel gear. The second axle bevel gear is drivingly engaged with the second axle bevel pinion 82.

While FIG. 1 depicts the input shaft 18 at no angle, an angle may be added. An angle may be added to optimize the joint angles for the main driveshaft from the transmission while maintaining the parallel and substantially collinear orientation of the inter-axle shaft 78 to the driven shaft 76 and the second axle bevel pinion 82. It can be appreciated without the device described above, the input shaft 18 and shafts 76, 78 must be parallel and changing the input shaft 18 angle has a direct effect on the inter-axle shaft joint angles.

Figure 2:
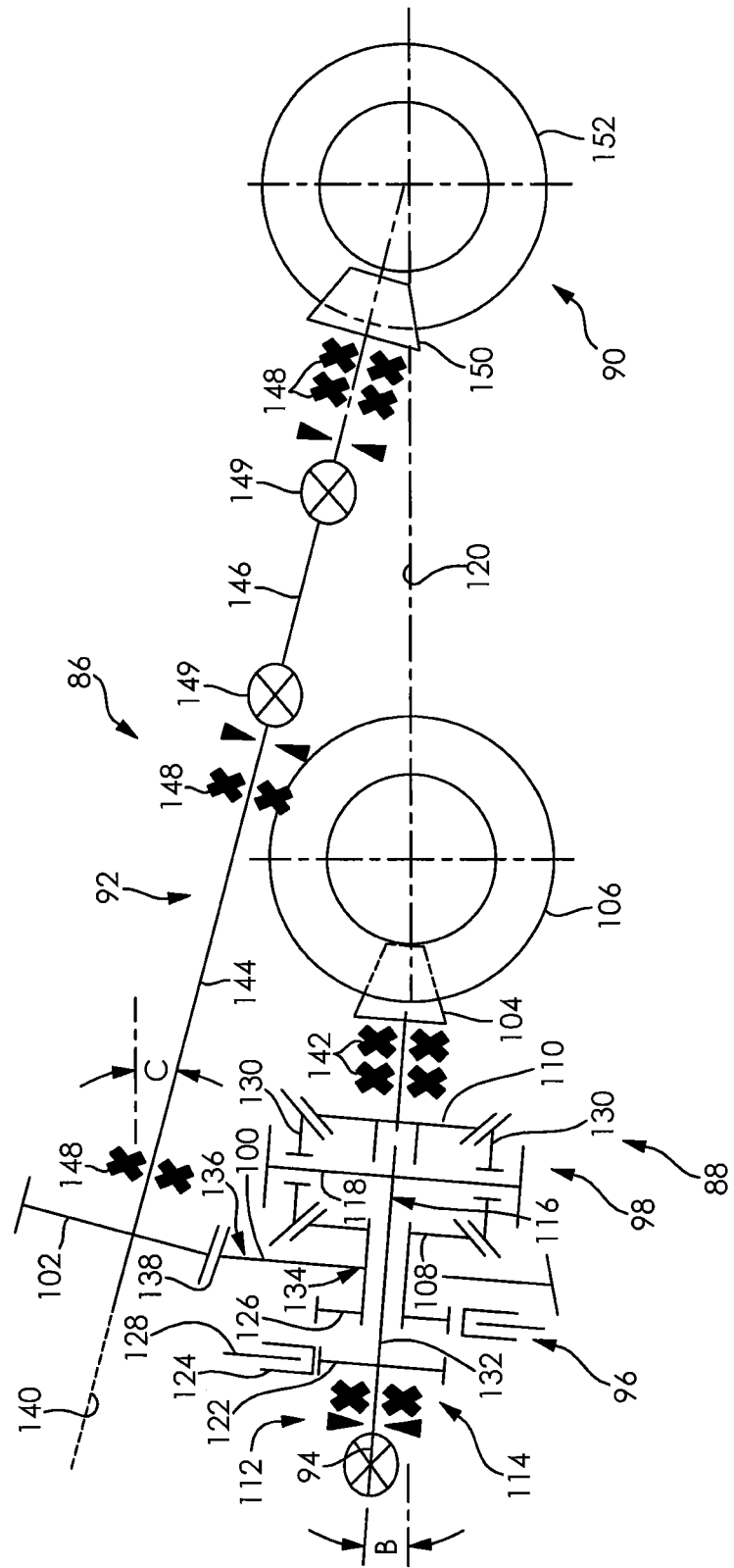
FIG. 2 depicts a schematic side view of another embodiment of a tandem axle system.

FIG. 2 illustrates a schematic side view of a drive axle system 86 for a vehicle according to a second embodiment. The drive axle system 86 includes a first axle assembly 88, a second axle assembly 90, and an inter-axle assembly 92. The first axle assembly 88, and the second axle assembly 90 may be part of a tandem axle system. The drive axle system 86 forms a portion of a vehicle drivetrain. As a non-limiting example, the drive axle system 86 may form a portion of the vehicle drivetrain of a semi-tractor; however it is understood the drive axle system 86 may be used in other applications.

The first axle assembly 86 includes an input shaft 94, an inter-axle clutch 96, an inter-axle differential 98, a second axle drive gear 100, a second axle driven gear 102, a first axle bevel pinion 104, and a first axle bevel gear 106. The inter-axle differential 98 includes a first inter-axle differential output gear 108 and a second inter-axle differential output gear 110. The first axle assembly 88 is disposed in a first housing (not shown) and is drivingly engaged with a transmission (not shown) of the vehicle, a first differential and axle (both not shown), and the inter-axle assembly 92.

The input shaft 94 has a first end 112 drivingly engaged with the transmission, a middle portion 114 that may be drivingly engaged with the inter-axle clutch 96, and a second end 116 drivingly engaged with a carrier 118 of the inter-axle differential 98.

As shown in FIG. 2, the input shaft 94 is angled with respect to a horizontal axis 120. The angle B represents the angle between the input shaft 94 and the axis 120. It can be appreciated that the input shaft 94 is not collinear with the axis 120. The input shaft 94 is substantially collinear with an axis of the first inter-axle differential output gear 108, the second inter-axle differential output gear 110, and an axis of the second axle drive gear 100.

The inter-axle clutch 96 comprises a gear 122 located on the input shaft 94. The gear 122 selectively receives a shift collar 124. In a first position (shown above the input shaft 94), the shift collar 124 is engaged with just the gear 122. In a second position (shown below the input shaft 94), the shift collar 124 slides in the axial direction to engage with a transfer shaft gear 126. The gear 126 alternatively may be splines.

The shift collar 124 connects with the input shaft gear 122 and the transfer shaft gear 126 by being moved with a shift fork 128. Although a shift fork 128 is shown, it can be understood that the inter-axle clutch 96 may be any type of clutching device.

The inter-axle differential 98 includes the spider 118, at least two driving pinions 130, the first inter-axle differential output gear 108, the second inter-axle differential output gear 110, and a transfer shaft 132. The first inter-axle differential output gear 108 and the second inter-axle differential output gear 110 disposed on the transfer shaft 132 form the side gears of the inter-axle differential 98. The inter-axle differential 98 is a bevel gear differential as known in the art, however, the inter-axle differential may be any other type of differential. When a rotational force is applied to the spider 118, the driving pinions 130 apply the rotational force to the first inter-axle differential output gear 108 and the second inter-axle differential output gear 110, which rotates the transfer shaft 132.

The transfer shaft 132 is a hollow shaft rotatably disposed in the first housing and has an axis of rotation concentric with the axis of rotation of the input shaft 18. One end portion of the transfer shaft 132 has the output gears 108, 110, and the other end has the gear 126 for selectively receiving the clutch 96 thereon.

The second axle drive gear 100 is a gear concentrically disposed on or about a portion of the transfer shaft 132. The second axle drive gear 100 may be disposed between the output gears 108, 110, and the transfer shaft gear 126. The second axle drive gear 100 is a substantially disc shaped body having an inner diameter portion 134, an outer diameter portion 136, and an engagement surface 138. The axis of the second axle drive gear 100 is concentric with the axis of the input shaft 94.

A set of gear teeth are formed on the outer diameter portion 136. The set of gear teeth formed on the outer diameter portion 136 form a bevel gear, and may be one of a modified helical gear, a spiral bevel gear, a beveloid gear, and a straight bevel gear. The second axle drive gear 100 is drivingly engaged with the second axle driven gear 102.

The second axle driven gear 102 is located on the outer diameter portion 136 of the second axle drive gear 100. More particularly, the second axle driven gear 102 is not concentric with the second axle drive gear 100 but instead it is in contact with a discrete location on the outer diameter of the second axle drive gear 100. The second driven axle gear 102 is engaged with just the top of the second drive axle gear 100. This location elevates a rotational axis 140 of the second driven axle gear 102 above the second drive axle gear 100 and the other components of the first axle assembly 88. The driven gear may be one of a modified helical gear, a spiral bevel gar, a beveloid gear and a straight bevel gear.

The bevel of either, or both, of the second axle drive gear 100 and/or the second axle driven gear 102 results in the second axle driven gear axis 140 to be non-parallel to the input shaft 94. The axis 140 is located at an Angle C from a horizontal axis, which may be 1 degree to 30 degrees below the horizontal axis.

The first axle bevel pinion 104 is drivingly coupled to the second inter-axle differential output gear 110. Alternately, the first axle bevel pinion 104 may be integrally formed with the second inter-axle differential output gear 110. The first axle bevel pinion 104 is rotationally supported on bearings 142. The first axle bevel pinion 104 may be one of a spiral bevel gear, a straight bevel gear, and a hypoid gear.

The first axle bevel gear 106 is drivingly engaged with the first axle bevel pinion 104. The rotation from the first axle bevel pinion 104 is imparted to the first axle bevel gear 106. The bevel gear 106 rotates the differential (not shown) which imparts rotation to the axle half shafts (not shown). The first axle bevel gear 106 may be one of a spiral bevel gear, a straight bevel gear, and a hypoid gear.

The second axle driven gear 102 is disposed on a driven shaft 144. The driven shaft 144 comprises a part of an inter-axle shaft assembly 92. The assembly 92 also comprises an inter-axle shaft 146.

Bearings 148 disposed about the driven shaft 144 and inter-axle shaft 146 support them for rotation. The driven shaft 144 is oriented substantially co-axial with the axis 140 of the second axle driven gear 102. The driven shaft 144 is drivingly engaged with the inter-axle shaft 146, such as through a U-joint 149.

The inter-axle shaft 146 comprises at least one elongate cylindrical member drivingly engaged with the driven shaft 144 and a second axle bevel pinion 150. As illustrated, the inter-axle shaft 146 has U-joints 149 disposed on each end thereof. One joint is connected to the driven shaft 144 and the other joint is connected to the second axle bevel pinion 150. The inter-axle shaft 146 is oriented substantially parallel and substantially collinear to the driven shaft 144 and the second axle bevel pinion 150.

Substantially collinear as used herein preferably means collinear or so that from one shaft to the next shaft not more than 6 degrees (plus or minus) of angle is provided. More preferably, substantially collinear as used herein means that there is not more than approximately 1 to 3 degrees (plus or minus) angle from one shaft to the next.

The second axle assembly 90 includes the second axle bevel pinion 150 and a second axle bevel gear 152. The second axle assembly 90 is disposed in a second housing (not shown) and is drivingly engaged with the inter-axle shaft 146 and a second differential and axle (not shown). The second axle bevel pinion 150 is axially aligned with the inter-axle shaft 146; the second axle bevel pinion 150 is not parallel to the input shaft 94.

The second axle bevel pinion 150 has gear teeth formed on an outer surface thereof. The second axle bevel pinion 150 may be one of a hypoid gear, a spiral bevel gear, a straight bevel gear, a positive offset hypoid gear, and a negative offset hypoid gear.

The second axle bevel gear 152 is coupled to a housing of the second differential by a plurality of fasteners or a weld and is rotatable about an axis thereof. Alternately, the second axle bevel gear 152 may be integrally formed with the second differential. As is known in the art, the second axle bevel gear 152 has gear teeth formed on an outer surface thereof. The second axle bevel gear 152 may be one of a spiral bevel gear or a straight bevel gear. The second axle bevel gear 152 is drivingly engaged with the second axle bevel pinion 150.

While FIG. 2 depicts the input shaft 18 at an angle, any angle may be used. The angle may be used to optimize the joint angles for the main driveshaft from the transmission while maintaining the parallel and substantially collinear orientation of the inter-axle shaft 146 to the driven shaft 144 and the second axle bevel pinion 148.

Figure 3:
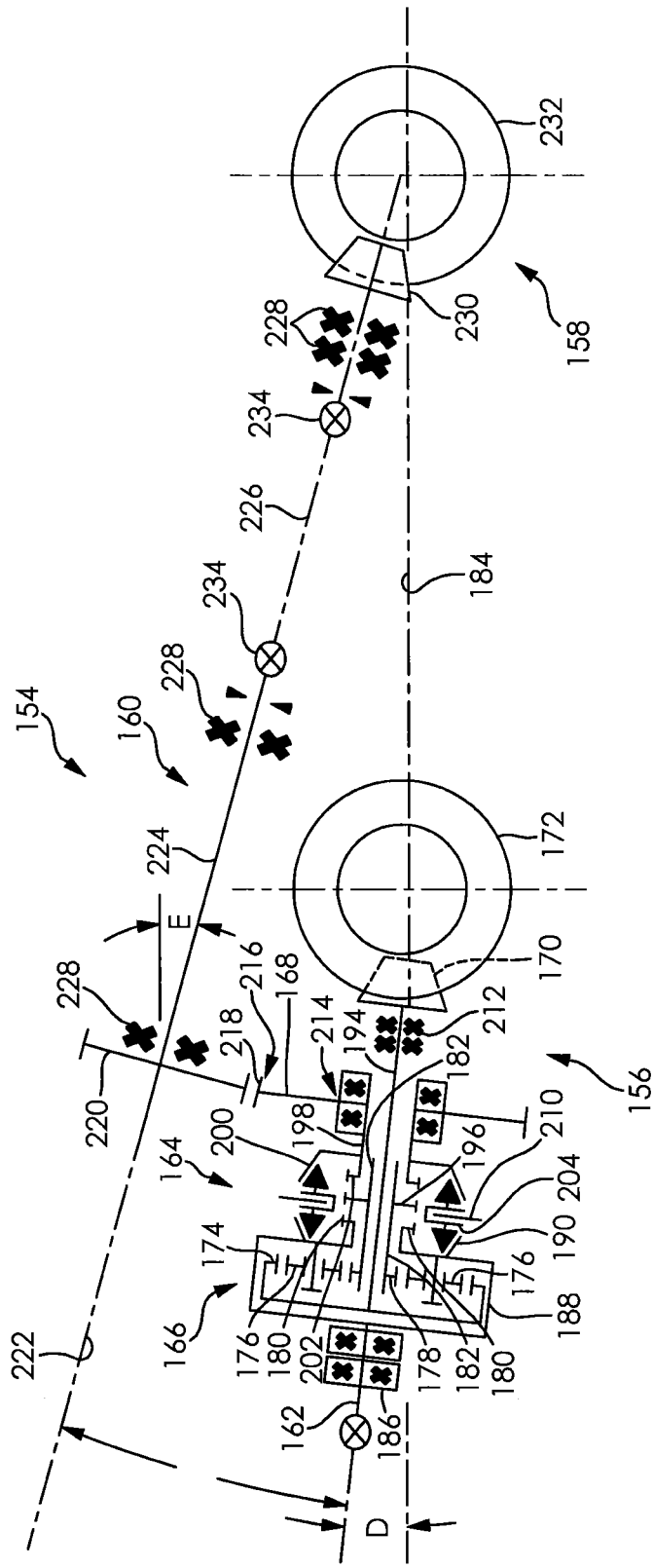
FIG. 3 depicts a schematic side view of another embodiment of a tandem axle system.

FIG. 3 illustrates a schematic side view of a drive axle system 154 for a vehicle according to a third embodiment. The drive axle system 154 includes a first axle assembly 156, a second axle assembly 158, and an inter-axle shaft assembly 160. The first axle assembly 156 and the second axle assembly 158 may be part of a tandem axle system. The drive axle system 160 forms a portion of a vehicle drivetrain. As a non-limiting example, the drive axle system 10 may form a portion of the vehicle drivetrain of a semi-tractor; however it is understood the drive axle system 10 may be used in other applications.

The first axle assembly 156 includes an input shaft 162, an inter-axle clutch 164, an inter-axle differential 166, a second axle drive gear 168, a first axle bevel pinion 170, and a first axle bevel gear 172. The inter-axle differential 166 includes a ring gear 174, a plurality of driving planet gears 176, a sun gear 178, a first inter-axle differential output gear 180, and a transfer shaft 182. The first axle assembly 156 is disposed in a first housing (not shown) and is drivingly engaged with a transmission (not shown) of the vehicle, a first differential and axle (not shown), and the inter-axle shaft assembly 160.

The input shaft 162 is drivingly engaged with the transmission. As shown in FIG. 3, the input shaft 162 is shaft is oriented at a low angle D with respect to a horizontal axis 184. As a non-limiting example, the angle may be between 1° and 30°. Further, the input shaft 162 is oriented to be substantially collinear with the first axle bevel pinion 170.

The input shaft 162 is at least partially disposed in the first housing. Bearings 186 disposed between the input shaft 162 and the first housing permit the input shaft 162 to rotate within the housing.

The input shaft 162 is directly rotationally connected to a planetary housing 188. The housing 188 contains the ring gear 174, the planets 176 and the sun gear 178. The housing 188 has a cone clutch surface 190 thereon and gear 180, or splines, for selectively receiving the inter-axle clutch 164.

The ring gear 174 is directly connected to the first axle bevel gear 172 via a carrier shaft 194. The carrier shaft 194 is substantially collinear with the input shaft 162. The transfer shaft 182 is drivingly connected to the sun gear 178 and is concentric with the sun gear 178. A gear 196, or splines, are located on an outer diameter of the transfer shaft 182. A second axle gear shaft 198 is concentric with the transfer shaft 182 and the carrier shaft 194. The second axle gear shaft 198 at one end has a cone clutch surface 200 and a gear 202, or set of splines. The other end of the second axle gear shaft 198 has the second axle drive gear 168 mounted for rotation therewith.

The inter-axle clutch 164 comprises a shift collar 204 which may be drivingly engaged with the cone clutch surface 190 on the planetary housing 188 and the first inter-axle differential output gear 180. The shift collar 204 may also be engaged with the transfer shaft gear 196. Additionally, the shift collar 204 may be engaged with the gear 202 on the second axle drive gear shaft 198. The shift collar 204 has first and second cones 206, 208, for selectively contacting the planetary housing surface 190, and the second axle drive gear shaft surface 200. A shift fork 210 selectively axially moves the shift collar 204 between the above-described locations.

Bearings 212 disposed between the first axle pinion gear 170 and the first housing support the pinion gear 170 and permit it to rotate substantially collinear with the input shaft 162.

The second axle drive gear 168 is a gear concentrically disposed on or about a portion of the transfer shaft 182. The second axle drive gear 168 may be disposed between the transfer shaft gear 196 and the first axle bevel pinion 170. The second axle drive gear 168 is a substantially disc shaped body having an inner diameter pinion 214, an outer diameter portion 216, and an engagement surface 218. The axis of the second axle drive gear 168 is concurrent with the axis of the input shaft 162.

A set of gear teeth are formed on the outer diameter portion 216. The set of gear teeth formed on the outer diameter portion 216 form a bevel gear, and may be one of a modified helical gear, a spiral bevel gear, a beveloid gear, and a straight bevel gear. The second axle drive gear 168 is drivingly engaged with a second axle driven gear 220.

The second axle driven gear 220 is located on the outer diameter portion 216 of the second axle drive gear 168. More particularly, the second axle driven gear 220 is not concentric with the second axle drive gear 168 but instead it is in contact with a discrete location on the outer diameter portion 216 of the second axle drive gear 168. The second driven axle gear 220 is engaged with just the top of the second drive axle gear 168. This location elevates a rotational axis 222 of the second driven axle gear 220 above the second drive axle gear 168 and the other components of the first axle assembly 156. The driven gear 220 may be one of a modified helical gear, a spiral bevel gear, a beveloid gear and a straight bevel gear.

The bevel of either, or both, of the second axle drive gear 156 and/or the second axle driven gear 220 results in the second axle driven gear axis 222 to be non-parallel to the input shaft 162 axis. The second axle driven gear axis 222 is depicted in FIG. 3 as being located below a horizontal axis at angle E. Angle E may be 1 degree to 30 degrees below the input shaft axis 162 and/or the horizontal axis.

The first axle bevel pinion 170 is drivingly coupled to the shaft 194. The first axle bevel pinion 170 has gear teeth formed on an outer surface thereof. The first axle bevel pinion 170 may be one of a spiral bevel gear, a straight bevel gear, and a hypoid gear. The first axle bevel pinion 170 is drivingly coupled to the first axle bevel gear 172.

The first axle bevel gear 712 is coupled to a housing of the first differential (not shown) and axle by a plurality of fasteners or a weld and is rotatable about an axis thereof. Alternately, the first axle bevel gear 172 may be integrally formed with the first differential. The first axle bevel gear 172 has gear teeth formed on an outer surface thereof. The first axle bevel gear 172 may be one of a spiral bevel gear, a straight bevel gear, and a hypoid gear. The rotation from the first axle bevel pinion 170 is imparted to the first axle bevel gear 172. The bevel gear 172 rotates the differential which imparts rotation to the axle half shafts (not shown).

The second axle driven gear 220 is disposed on a driven shaft 224. The driven shaft 224 comprises a part of the inter-axle assembly 160. The assembly 160 also comprises an inter-axle shaft 226 and U-joints 234.

Bearings 228 disposed about the driven shaft support 224 and the inter-axle shaft 226 support them for rotation. The driven shaft 224 is oriented substantially parallel and substantially co-axial with the axis 222 of the second axle driven gear 220. The driven shaft 224 is drivingly engaged with the inter-axle shaft 226, such as through a U-joint 234.

The inter-axle shaft 226 comprises at least one elongate cylindrical member drivingly engaged with the driven shaft 224 and a second axle bevel pinion 230. As illustrated, the inter-axle shaft 226 comprises an elongate cylindrical member having U-joints 234 disposed on each end thereof. One joint 234 is connected to the driven shaft 224 and the other joint 234 is connected to the second axle bevel pinion 230. The inter-axle shaft 226 is oriented substantially parallel and substantially collinear to the driven shaft 224 and the second axle bevel pinion 230; the second axle bevel pinion 230 is not parallel to the input shaft 162.

Substantially collinear as used herein preferably means collinear or so that from one shaft to the next shaft not more than 6 degrees (plus or minus) of angle is provided. More preferably, substantially collinear as used herein means that there is not more than approximately 1 to 3 degrees (plus or minus) angle from one shaft to the next.

The second axle assembly 158 includes the second axle bevel pinion 230 and a second axle bevel gear 232. The second axle assembly 158 is disposed in a second housing (not shown) and is drivingly engaged with the inter-axle shaft assembly and a second differential and axle (not shown). The second axle bevel pinion 230 is substantially axially aligned with the inter-axle shaft 226. Thus, an axis of the second axle bevel pinion 230 is at an angle between 1 and 30 degrees elevated from the horizontal.

The second axle bevel pinion 230 has gear teeth formed on an outer surface thereof. The second axle bevel pinion 230 may be one of a spiral bevel gear, a straight bevel gear, a positive offset hypoid gear, and a negative offset hypoid gear.

The second axle bevel gear 232 is coupled to a housing of the second differential by a plurality of fasteners or a weld and is rotatable about an axis thereof. Alternately, the second axle bevel gear 232 may be integrally formed with the second differential. As is known in the art, the second axle bevel gear 232 has gear teeth formed on an outer surface thereof. The second axle bevel gear 232 may be one of a hypoid, a spiral bevel gear or a straight bevel gear. The second axle bevel gear 232 is drivingly engaged with the second axle bevel pinion 230.

While FIG. 3 depicts the input shaft 18 at one angle, other angles are permissible. An angle may be used to optimize the joint angles for the main driveshaft from the transmission while maintaining the parallel and substantially collinear orientation of the inter-axle shaft 226 to the driven shaft 224 and the second axle bevel pinion 228.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A drive axle system for a vehicle, comprising:
  a first axle assembly, comprising:
    an input shaft directly connected to a differential carrier, and a transfer shaft, concentric with said input shaft, directly connected to a inter-axle differential output gear;
    a pinion gear and a ring gear;
    a clutch selectively engageable between an input shaft gear, said transfer shaft and a bevel second drive axle gear;
    a bevel second driven axle gear directly drivingly connected to one upper, outer diameter portion of said bevel second drive axle gear;
    a driven axle shaft driven by said bevel second driven axle gear wherein said driven axle shaft is non-parallel to and above said input shaft; and
  a second axle assembly, comprising a pinion gear and a ring gear, wherein said pinion gear is driven by said driven axle shaft and is collinear therewith.

2. The drive axle system according to claim 1, wherein said input shaft has a clutch gear thereon, said transfer shaft has another clutch gear thereon and said bevel second drive axle gear connects with said clutch.

3. The drive axle system according to claim 2, wherein said clutch is a cone-type clutch with cones engaging said clutch gear and said bevel second drive axle gear.

4. The drive axle system according to claim 1, wherein said first axle assembly pinion gear is substantially collinear with said input shaft, but said second axle assembly pinion gear is not collinear said input shaft or said first axle assembly pinion gear.

5. The drive axle system according to claim 1, wherein said driven axle gear and said driven axle shaft are located above said first axle assembly and said first axle assembly ring and pinion gear.

6. A drive axle system for a vehicle, comprising:
  an angled first axle assembly, comprising:
    an input shaft angled downwardly with respect to the horizontal, said input shaft connected to a differential carrier;
    a transfer shaft, concentric with said input shaft, directly connected to a second inter-axle differential output gear;
    a pinion gear and a ring gear;
    a clutch selectively engageable between an input shaft gear and said transfer shaft;
    a bevel second drive axle gear mounted on said transfer shaft;
    a bevel second driven axle gear directly drivingly connected to one upper, outer diameter portion of said bevel second drive axle gear;
    a driven axle shaft driven by said bevel second driven axle gear, wherein said driven axle shaft is non-parallel to and above said input shaft; and
  a second axle assembly comprising a pinion gear and a ring gear, wherein said pinion gear is driven by said driven axle shaft and is substantially collinear therewith.

7. The drive axle system according to claim 6, wherein a shift collar axially selectively connects a gear on said input shaft and a gear on said transfer shaft.

8. The drive axle system according to claim 6, wherein said first axle assembly pinion gear is substantially collinear with said input shaft but said second axle assembly pinion gear is not collinear with said first axle assembly pinion gear.

9. The drive axle system according to claim 6, wherein said input shaft, said first axle assembly pinion gear and said transfer shaft are substantially collinear with one another but angled with respect to said driven axle shaft.

10. A drive axle system for a vehicle, comprising:
  a downwardly angled first axle assembly, comprising:
    an input shaft angled downwardly with respect to the horizontal, said input shaft connected to a planetary housing, said planetary housing having a carrier, pinions and a sun gear;
    a transfer shaft, collinear with said input shaft, drivingly connected to said pinions;
    a pinion gear and a ring gear;

a clutch selectively engageable between said planetary housing and a bevel second axle drive gear;

a bevel second driven axle gear directly drivingly connected to one upper, outer diameter portion of said bevel second drive axle gear;

a driven axle shaft driven by said bevel second driven axle gear, wherein said driven axle shaft is non-parallel to and above said input shaft; and a second axle assembly comprising a pinion gear and a ring gear, wherein said pinion gear is driven by said driven axle shaft and is substantially collinear therewith.

11. The drive axle system according to claim 10, wherein said clutch selectively connects said planetary housing, said transfer shaft and said bevel second driven axle gear.

12. The drive axle system according to claim 10, wherein said input shaft, said transfer shaft, said first axle assembly pinion shaft are all substantially collinear with one another.

13. The drive axle system according to claim 10 wherein said clutch is a cone-type clutch having cones that selectively engage said planetary housing and said driven axle shaft.

* * * * *